UNITED STATES PATENT OFFICE.

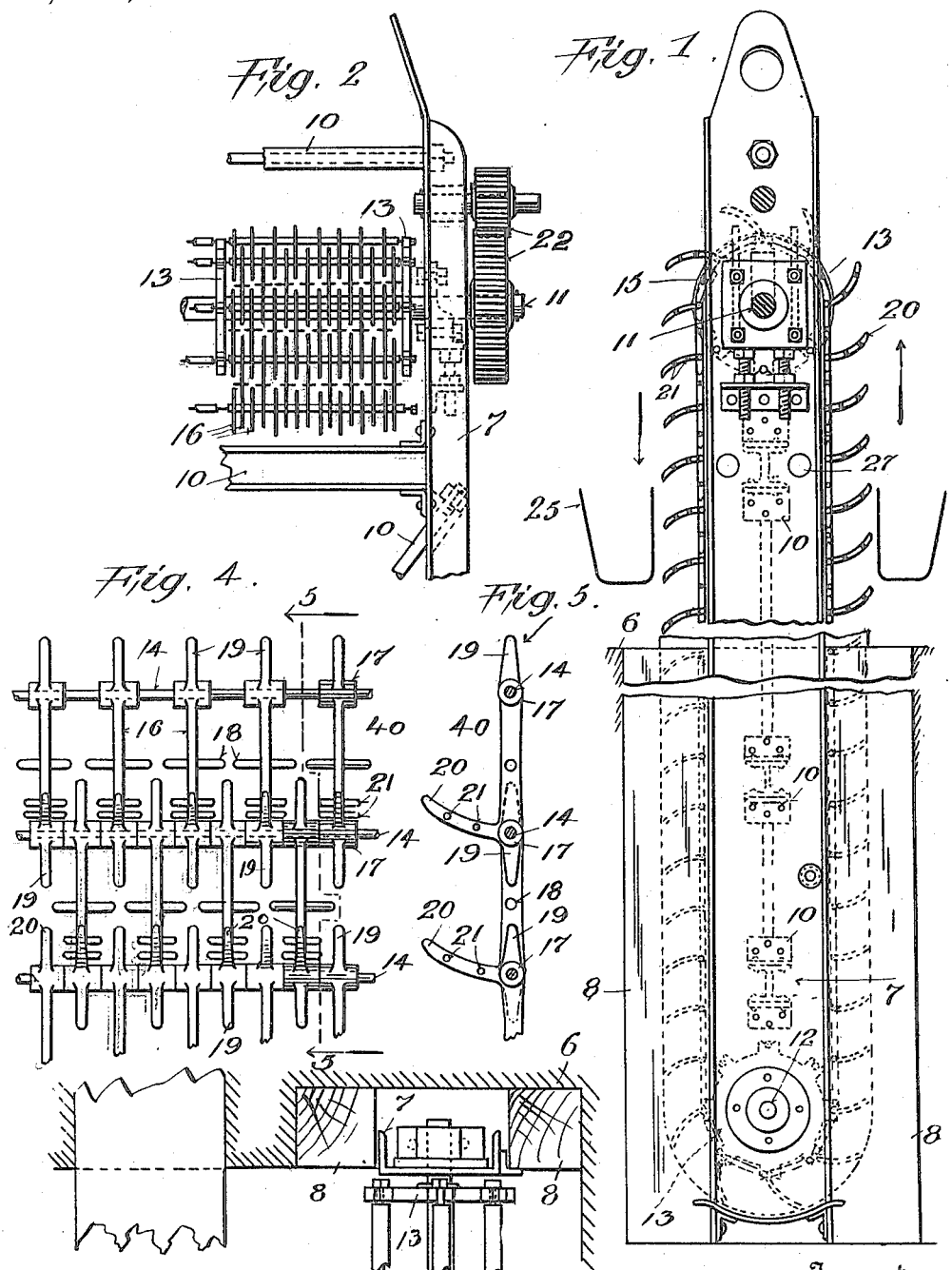

CHARLES L. DAVIDSON, OF NEW YORK, N. Y.

SCREEN.

1,207,376.   Specification of Letters Patent.   Patented Dec. 5, 1916.

Application filed August 5, 1915. Serial No. 43,744.

*To all whom it may concern:*

Be it known that I, CHARLES L. DAVIDSON, a citizen of the United States, residing at New York, in the county of New York, State of New York, have made a certain new and useful Invention in Screens, of which the following is a specification.

This invention relates to screens and while well adapted for many purposes is specially designed for use in connection with the condenser water supply for power plants.

The object of the invention is to provide a screen of simple structure, which is economical to manufacture, and efficient in operation.

A further object is to provide a screen structure which efficiently arrests and removes any collection of sticks, leaves or the like which may be supplied along with the water from the source of supply, and in such manner as to prevent the screen from becoming clogged.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing,—Figure 1 is a broken view partly in end elevation and partly in vertical section, showing a screen structure embodying the principles of my invention. Fig. 2 is a broken view in side elevation of the same showing means to operate the screen element. Fig. 3 is a broken view in top plan, parts in horizontal section. Fig. 4 is a fragmentary view in side elevation of a portion of the screen element. Fig. 5 is a broken view in section on the line 5, 5, Fig. 4.

The same part is designated by the same reference numeral wherever it occurs throughout the several views.

At the intakes for water supply systems for service or other purposes, and particularly at intakes for the supply of water for the condensers of power plants it is a common expedient to employ screens for the purpose of preventing sticks, leaves, or other debris from entering the supply pipes to the condensers or to the mains. Where the water supply is drawn from rivers, streams, lakes, reservoirs, or the like, the provision of screens is necessary on account of the accumulation in such bodies of leaves, sticks or the like. It frequently happens that such an accumulation of arrested debris collects upon the screen as to impede if not prevent the free flow of the water therethrough, and any attempt to agitate the collected debris to clear the screen will be only temporarily effective. The removal of the screen, or portions of the screen structure for the purpose of cleaning is objectionable, not only on account of the labor and delay incident thereto but also because of the danger of leaves, sticks or other foreign matter passing into the service pipes while the screen or parts thereof are removed from the strainer well. It is among the special purposes of my present invention to avoid these objections as to provide a screen structure in which an endless screen element is employed having means to move it in the frame in which the device is held in the strainer well, and which element is provided with fingers to lift the accumulated debris when said element is moved, so as to remove such debris while, at the same time, presenting a fresh clean strainer surface of the element to the incoming water.

In the drawing in which I have illustrated a construction embodying the principles of my invention, reference numeral 6 designates a portion of the walls of a strainer well in which the screen structure is located at the intake of a water supply source, the water flowing from the source through the screen from one side thereof to the other side for delivery to the service pipes or mains. The screen frame side members 7, are positioned vertically between the vertical stringers 8, which are erected within the well 9. The side members 7 of the screen frame are connected together by suitable cross braces 10 into a rigid framework. Shafts 11, 12, are journaled at their ends in the side members 7, at the upper and lower ends respectively of said side members, and upon said shafts are mounted suitable sprocket wheels 13, over which works the endless screen member or apron designated generally by reference numeral 15. This apron is composed of transverse rods 14, which are connected together by a series of links 16, the latter being loosely sleeved upon said rods in alternating relation. That is to say, each link is provided with a sleeve hub 17, adjacent each end thereof, a transverse rod 14 passing through each sleeve hub, but between the hubs at the same ends of adjacent links connecting adjacent transverse rods is interposed the hub sleeve at one end of another link which connects one of said rods to the next rod of the series. Each link is provided with laterally extending pins or projections 18, on the side edges thereof, while the extreme ends 19 of each link, extends beyond the rods 14, on which said link is loosely sleeved. This structure provides an efficient screen surface through which the water may flow but which will arrest and retain any foreign substance like leaves, sticks, or other trash. In order to remove any accumulation of debris, the lower portion of each link on the receiving side of the screen is provided with an outwardly and upwardly extending hook 20, and each hook is provided with laterally projecting pins 21, on the side edges thereof.

In order to clear the screen of an accumulation of debris all that is necessary is to shift the screen member 15 in the direction indicated by the arrows in Fig. 1. Any suitable or convenient means may be employed to shift this screen member. A simple arrangement is shown wherein the upper sprocket wheel shaft 11 is rotatively actuated, as, for instance, through suitable gears 22, and a crank handle (not shown) applied to the axis of one of said gears. Of course it is obvious that any other suitable means may be employed to shift the endless screen. By thus shifting the screen not only is the accumulation of debris hoisted out of the well or chamber in which the screen structure is erected but a fresh clean surface of the screen element is presented to the intake side of the structure. The debris caught by the screen is elevated over the upper sprocket shaft and is deposited into a suitable receptacle 25, placed at the rear side of the screen to receive the same.

If necessary or desired, the screen may be cleaned of any adhering debris which may not fall from the screen after passing over the upper sprocket shaft by the application of a jet of water from a perforated pipe indicated at 27 which is arranged to extend transversely between the two legs or runs of the screen.

Many variations and changes in the details may readily occur to persons skilled in the art and still fall within the spirit and scope of my invention.

Having now set forth the objects and nature of my invention and a construction embodying the principles thereof, what I claim as new and useful and of my own invention, and desire to secure by Letters Patent, is,—

1. In a screen structure for water intakes, a screen frame, shafts journaled at the upper and lower ends of said frame, an endless screen member arranged to operate over said shafts, said screen member comprising transverse rods and connecting links connecting said rods, adjacent links being connected at opposite ends to the same rod, said links being provided with a curved portion and two projections at right angles thereto, and the curved portion thereof being provided with laterally extending pins.

2. In a screen structure for water intakes, a movable endless screen member consisting of transverse rods and connecting links, each link being loosely connected at its ends to adjacent rods, adjacent links being connected at opposite ends to the same rod, said links having outwardly extending hooks at their lower ends, said hooks having laterally extending pins.

In testimony whereof I have hereunto set my hand, in the presence of the subscribing witnesses, on this 2nd day of August, A. D. 1915.

CHARLES L. DAVIDSON.

Witnesses:
MARJORIE A. GRAEVE,
S. E. DARBY.

Copies of this patent may be obtained for five cents each, by addressing the "Commissioner of Patents, Washington, D. C."